US007730867B2

(12) United States Patent
Fonville et al.

(10) Patent No.: US 7,730,867 B2
(45) Date of Patent: Jun. 8, 2010

(54) ENGINE INCLUDING A SELF-ADJUSTING THERMALLY COMPLIANT BRACKET

(75) Inventors: Carl E. Fonville, Ann Arbor, MI (US); Michael A. Karram, Flint, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 339 days.

(21) Appl. No.: 12/030,940

(22) Filed: Feb. 14, 2008

(65) Prior Publication Data

US 2009/0205605 A1 Aug. 20, 2009

(51) Int. Cl.
*F16M 13/00* (2006.01)

(52) U.S. Cl. .................... 123/195 A; 248/560; 248/901

(58) Field of Classification Search ............. 123/195 R, 123/195 A; 248/560, 901

See application file for complete search history.

(56) References Cited

FOREIGN PATENT DOCUMENTS

EP 491485 A1 * 6/1992

* cited by examiner

*Primary Examiner*—Noah Kamen
(74) *Attorney, Agent, or Firm*—Harness, Dickey & Pierce, P.L.C.

(57) ABSTRACT

An engine bracket assembly may include a first mounting portion, a second mounting portion, and a support member. The first mounting portion may fix a first end of the bracket assembly to the engine and the second mounting portion may fix a second end of the bracket assembly to the engine. The support member may support an engine component and may be disposed between and coupled to the first and second mounting portions. The coupling between the first and second mounting portions and the support member may provide relative displacement between the first mounting portion and the support member in a longitudinal direction extending from one of the first and second mounting portions toward the other of the first and second mounting portions during thermal expansion of the bracket assembly.

20 Claims, 3 Drawing Sheets

ENGINE INCLUDING A SELF-ADJUSTING THERMALLY COMPLIANT BRACKET

FIELD

The present disclosure relates to engine bracket assemblies, and more specifically to controlling loads applied between engine components due to varying thermal growth between the components.

BACKGROUND

The statements in this section merely provide background information related to the present disclosure and may not constitute prior art.

Engine assemblies include a variety of components that are fixed to an engine structure such as an engine block or a cylinder head. During engine operation, the thermal loads applied to the components and engine structure may result in different rates of thermal expansion between the parts. For example, when a bracket assembly is fixed to a cylinder head of the engine at two or more points, expansion of the bracket assembly at a greater rate than the cylinder head may result in an increased stress on the cylinder head. The increased stress may result in cracking of the cylinder head. The different rates of thermal expansion experienced between the engine structure and components may result from different thermal loads applied to each part or may result from each part having material properties, such as thermal expansion rates, that are different from one another.

SUMMARY

An engine bracket assembly may include a first mounting portion, a second mounting portion, and a support member. The first mounting portion may fix a first end of the bracket assembly to the engine and the second mounting portion may fix a second end of the bracket assembly to the engine. The support member may support an engine component and may be disposed between and coupled to the first and second mounting portions. The coupling between the first and second mounting portions and the support member may provide relative displacement between the first mounting portion and the support member in a longitudinal direction extending from one of the first and second mounting portions toward the other of the first and second mounting portions during thermal expansion of the bracket assembly.

An engine assembly may include an engine structure, an engine component, and a bracket assembly. The bracket assembly may include a first mounting portion that fixes a first end of the bracket assembly to the engine structure, a second mounting portion that fixes a second end of the bracket assembly to the engine structure, and a support member that supports the engine component, the support member may be disposed between and coupled to the first and second mounting portions. The coupling between the first and second mounting portions and the support member may provide relative displacement between the first mounting portion and the support member in a longitudinal direction generally extending from one of the first and second mounting portions toward the other of the first and second mounting portions during thermal expansion of the bracket assembly.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
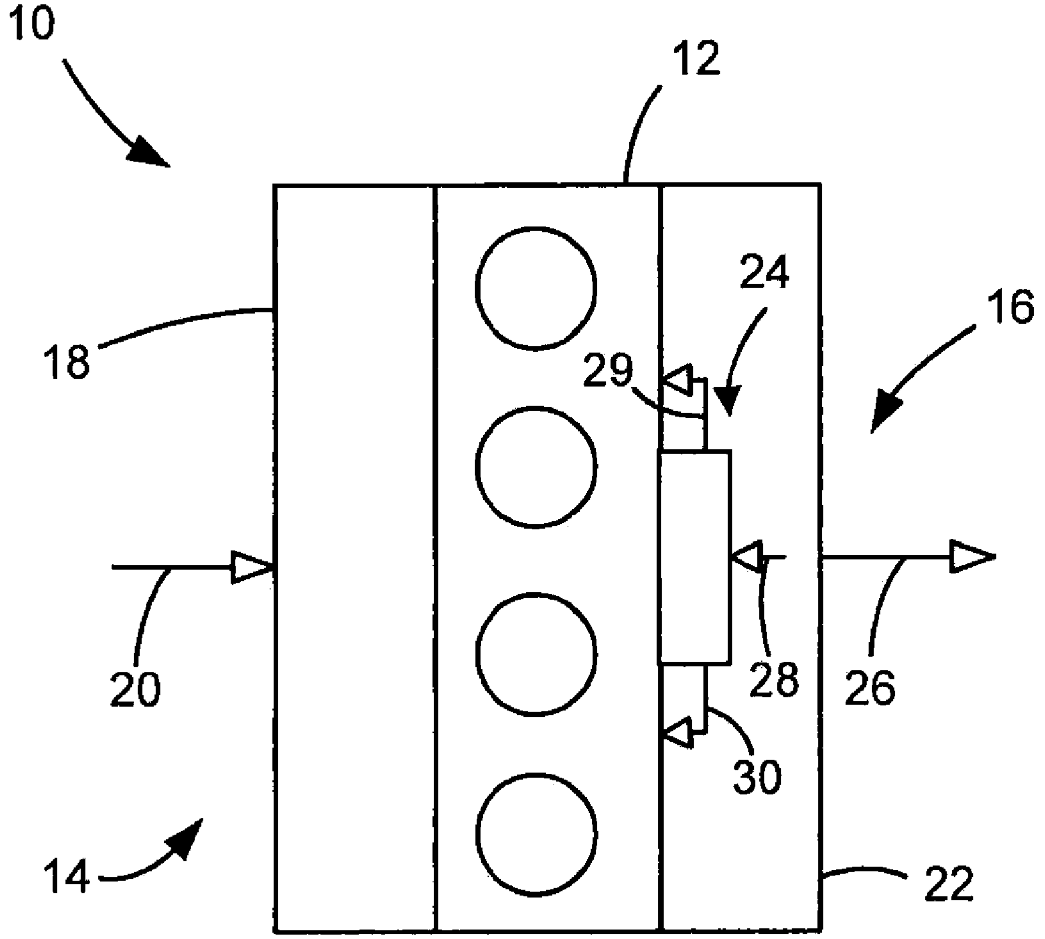
FIG. 1 is a schematic illustration of an engine assembly according to the present disclosure.

The following description is merely exemplary in nature and is not intended to limit the present disclosure, application, or uses. It should be understood that throughout the drawings, corresponding reference numerals indicate like or corresponding parts and features.

Referring to FIG. 1, an exemplary engine assembly 10 is schematically illustrated. The engine assembly 10 may include an engine 12 in communication with an intake system 14 and an exhaust system 16. In the example shown, the intake system 14 may include an intake manifold 18 that provides an air flow 20 into the engine 12. The exhaust system 16 may include an exhaust manifold 22 fixed to the engine 12 and an air injection system 24 fixed to the engine 12. The exhaust manifold 22 and air the injection system 24 may be in communication with exhaust gas from the engine 12. More specifically, the exhaust manifold 22 may direct an exhaust gas flow 26 from the engine 12 and the air injection system 24 may inject a fresh air supply 28, 29, 30 into the exhaust gas from the engine 12.

Figure 2:
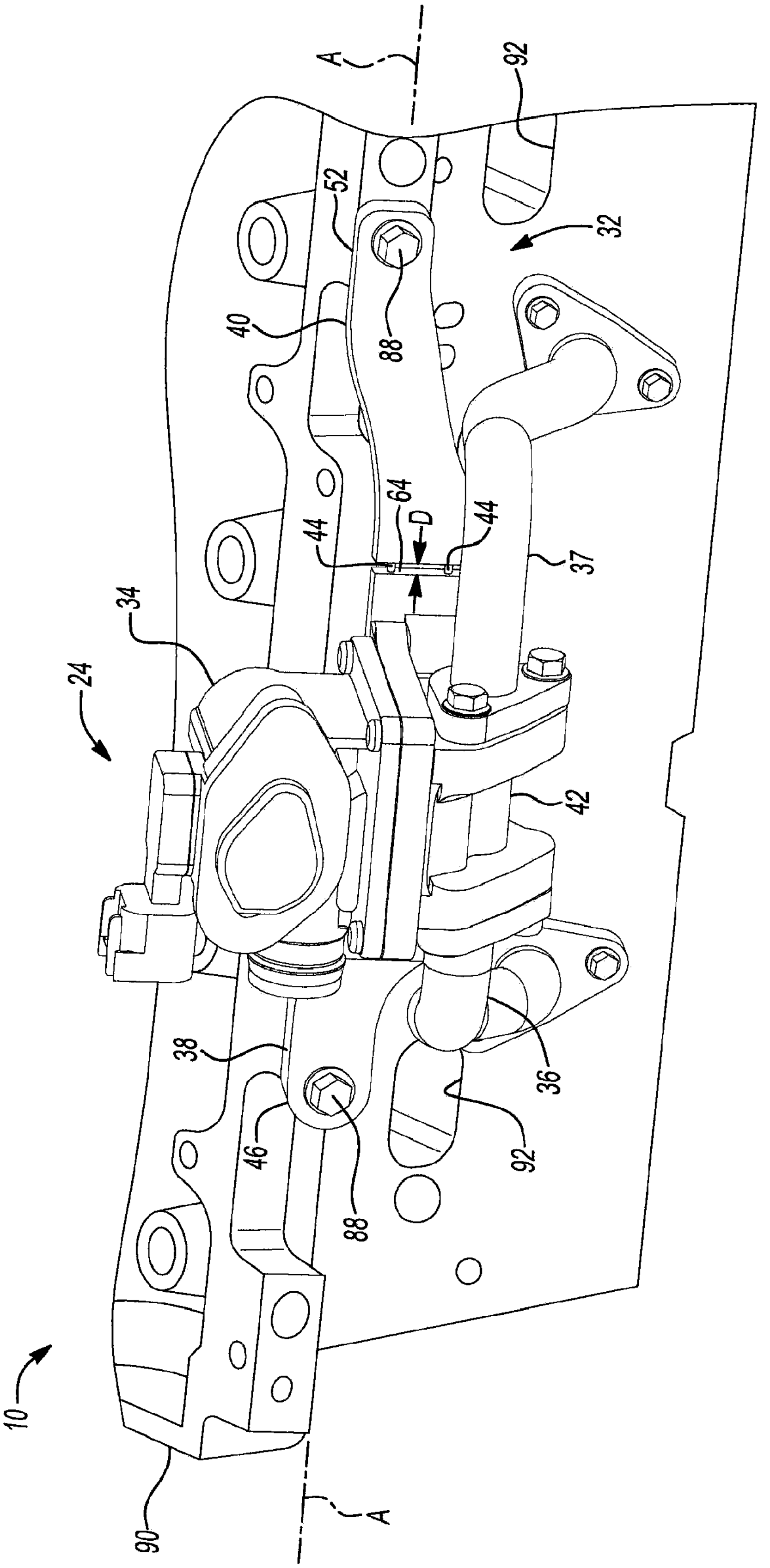
FIG. 2 is a fragmentary perspective view of the engine assembly of FIG. 1.
Figure 3:
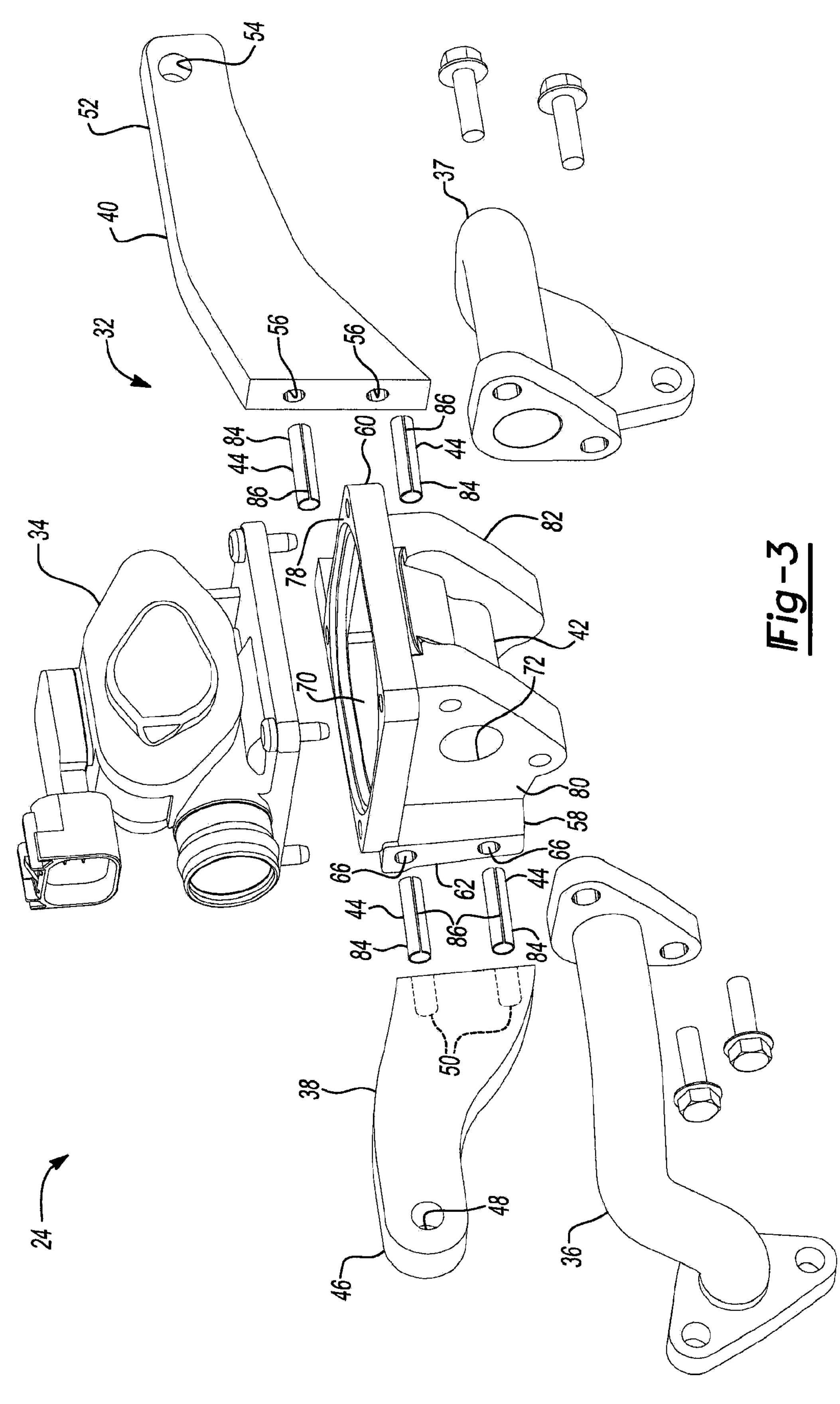
FIG. 3 is a perspective exploded view of an air injection system of the engine assembly of FIG. 1.

With reference to FIGS. 2 and 3, the air injection system 24 may include a bracket assembly 32, an air pump 34, and first and second conduits (or runners) 36, 37. The bracket assembly 32 may include first and second mounting members 38, 40, a support member 42, and coupling members 44. The first mounting member 38 may include a first mounting portion 46 including a first aperture 48 at a first end thereof and may include cylindrical recesses 50 extending into a second end thereof. The second mounting member 40 may be generally similar to the first mounting member 38 and may include a second mounting portion 52 having a second aperture 54 at a first end thereof and may include cylindrical recesses 56 at a second end thereof.

The support member 42 may include a flange portion 58 having an airflow communication member 60 fixed thereto. The flange portion 58 may include a first end portion 62 adjacent to the second end of the first mounting member 38 and a second end portion 64 adjacent to the second end of the second mounting member 40. The first end portion 62 may include cylindrical recesses 66 generally aligned with the cylindrical recesses 50 in the first mounting member 38 and the second end portion 64 may include cylindrical recesses (not shown) generally similar to the cylindrical recesses 66 and aligned with the cylindrical recesses 56 in the second mounting member 40.

In the present example, the airflow communication member 60 may be integrally formed with the flange portion 58. Therefore, the flange portion 58 and the airflow communication member 60 may be fixed relative to one another. The airflow communication member 60 may include first and second passages 70, 72 therein. The first passage 70 may extend through an upper surface 78 of the airflow communication member 60 and may be in communication with the second passage 72. The second passage 72 may extend through the first and second sides 80, 82 of the airflow communication member 60.

The coupling members 44 may each have a generally cylindrical body that generally conforms to the recesses 50, 56, 66 in the first and second mounting members 38, 40 and the flange portion 58. In the present example, the coupling members 44 may be in the form of slotted dowel pins. The coupling members 44 may therefore each include a generally hollow cylindrical body 84 having an axially extending slot 86 that extends the entire length of the cylindrical body 84 and allows radially inward and outward displacement of the cylindrical body 84. The coupling members 44 may be disposed within the recesses 50, 56, 66 in the first and second mounting members 38, 40 and the flange portion 58 and may couple the support member 42 to the first and second mounting members 38, 40 to provide a spacing (D), or air gap, between the support member 42 and each of the first and second mounting members 38, 40. While the spacing (D) is only shown between the support member 42 and the second mounting member 40 in FIG. 2, it is understood that a similar spacing may exist between the support member 42 and the first mounting member 38. The coupling members 44 may have a free diameter that is greater than the diameter of the recesses 50, 56, 66 in the first and second mounting members 38, 40 and the flange portion 58 to provide a radially outward biasing force within the recesses 50, 56, 66, to prevent transmission of vibrations between the first and second mounting members 38, 40 and the support member 42.

The first and second mounting members 38, 40 may be fixed to the engine 12. For example, as seen in FIG. 2, fasteners 88 may extend through the apertures 48, 54 and may fix the first and second mounting members 38, 40 to the engine 12, and more specifically to a cylinder head 90 of the engine 12. The pump 34 may be fixed to support the member 42 at the upper surface 78 of the airflow communication member 60. The pump 34 may be in communication with the first passage 70 and may provide a pressurized fresh air supply thereto. First ends of the first and second conduits 36, 37 may be fixed to the support member 42 at the first and second sides 80, 82 of the airflow communication member 60. Second ends of the first and second conduits 36, 37 may be fixed to the cylinder head 90 and may be in communication with exhaust ports 92 of the cylinder head 90. The first and second conduits 36, 37 may be in communication with the second passage 72 to provide the compressed fresh air from the pump 34 to the exhaust gas that exits the exhaust ports 92. Therefore, the support member 42 may be fixed relative to the engine 12, and more specifically relative to the cylinder head 90.

In operation, the thermal expansion rate of the bracket assembly 32, and more specifically, the thermal expansion rate of the first and second mounting members 38, 40, may be different than the thermal expansion rate of the portion of the engine 12 that the bracket assembly 32 is fixed to. The different rates of thermal expansion between the bracket assembly 32 and the portion of the engine 12 that the bracket assembly 32 is fixed to may be caused by differing material properties between the components or differing thermal loads experienced by the components.

In the present example, the first and second mounting members 38, 40 may experience a rate of thermal expansion that is greater than the thermal expansion rate of the cylinder head 90 due to the coupling between the bracket assembly 32 and the first and second conduits 36, 37. The communication between the first and second conduits 36, 37 and the exhaust gas may provide a thermal load on the bracket assembly 32 that is greater than a thermal load on the cylinder head 90 at the mounting location. As a result, the cylinder head 90 may experience thermal growth at a rate that is less than the thermal growth experienced by the bracket assembly 32.

In the present example, the initial spacing (D), or air gap, between the support member 42 and the first and second mounting members 38, 40 may provide for expansion of the first and second mounting members 38, 40 relative to one another in a longitudinal direction along an axis (A) extending between the first and second mounting portions 46, 52 without applying a load on the cylinder head 90. Rather than applying an expansion load to the cylinder head 90 along axis (A), the first and second mounting members 38, 40 may thermally grow inwardly toward one another along axis (A) and may extend further along coupling members 44, reducing the spacing (D), or air gap, therebetween.

The initial spacing (D), or air gap, may additionally inhibit the transfer of heat to the first and second mounting members 38, 40 from the first and second conduits 36, 37. The relative expansion of the first and second mounting members 38, 40 relative to one another and relative to the support member 42 may additionally prevent displacement, or bending, of the first and second conduits 36, 37 along axis (A).

What is claimed is:

1. An engine bracket assembly comprising:

a first mounting portion adapted to be fixed to an engine;

a second mounting portion adapted to be fixed to the engine; and a support member adapted to support an engine component, the support member being disposed between and coupled to the first and second mounting portions, the coupling between the first and second mounting portions and the support member providing relative displacement between the first mounting portion and the support member in a longitudinal direction extending from one of the first and second mounting portions toward the other of the first and second mounting portions during thermal expansion of the bracket assembly.

2. The engine bracket assembly of claim 1, wherein the support member is adapted to be fixed relative to the engine.

3. The engine bracket assembly of claim 2, further comprising a conduit that includes a first end that is fixed to the support member and a second end adapted to fix the conduit to the engine to provide communication between an engine exhaust gas and the engine component.

4. The engine bracket assembly of claim 3, wherein the coupling between the first and second mounting portions and the support member provides relative displacement between the first and second mounting portions in the longitudinal direction during thermal expansion of one of the first and second mounting portions, the conduit being generally isolated from displacement in the longitudinal direction due to thermal expansion of the one of the first and second mounting portions.

5. The engine bracket assembly of claim 1, further comprising a coupling member engaged with the support member and the first mounting portion that supports the support member on the first mounting portion and facilitates axial translation between the support member and the first mounting portion along the longitudinal direction.

6. The engine bracket assembly of claim 5, wherein the coupling member includes a pin that extends into a recess in one of the support member and the first mounting portion, the first mounting portion and the support member being displaceable relative to one another along a longitudinal axis of the pin.

7. The engine bracket assembly of claim 6, wherein the pin supports the support member on the first mounting portion.

8. The engine bracket assembly of claim 6, wherein the pin provides a radially outward biasing force within the recess to inhibit vibration of the support member relative to the first mounting portion.

9. The engine bracket assembly of claim 5, wherein the support member and the first mounting portion are individual components having a spacing therebetween with the coupling member extending along the spacing, the first mounting portion expanding into the spacing based on a thermal load applied thereto.

10. The engine bracket assembly of claim 9, wherein the spacing forms an air gap between the first mounting portion and the support member that inhibits heat transfer between the first mounting portion and the support member.

11. An engine assembly comprising:

an engine structure;

an engine component; and a bracket assembly including a first mounting portion that fixes a first end of the bracket assembly to the engine structure, a second mounting portion that fixes a second end of the bracket assembly to the engine structure, and a support member that supports the engine component, the support member disposed between and coupled to the first and second mounting portions, the coupling between the first and second mounting portions and the support member providing relative displacement between the first mounting portion and the support member in a longitudinal direction generally extending from one of the first and second mounting portions toward the other of the first and second mounting portions during thermal expansion of the bracket assembly.

12. The engine assembly of claim 11, wherein the engine component includes an air injection system including an air pump and a conduit, the air pump being in communication with an air supply and the conduit being fixed to the support member and the engine structure and providing communication between the air pump and an exhaust gas path in the engine structure.

13. The engine assembly of claim 12, wherein the engine structure includes a cylinder head having an exhaust port in communication with the conduit, the first and second mounting portions being fixed to the cylinder head.

14. The engine assembly of claim 13, wherein the coupling between the first and second mounting portions and the support member provides relative displacement between the first and second mounting portions in the longitudinal direction during thermal expansion of one of the first and second mounting portions, the conduit being generally isolated from displacement in the longitudinal direction due to the thermal expansion of the one of the first and second mounting portions.

15. The engine assembly of claim 11, further comprising a coupling member engaged with the support member and the first mounting portion that supports the support member on the first mounting portion and facilitates axial translation between the support member and the first mounting portion along the longitudinal direction.

16. The engine assembly of claim 15, wherein the coupling member includes a pin that extends into a recess in one of the support member and the first mounting portion, the first mounting portion and the support member being displaceable relative to one another along a longitudinal axis of the pin.

17. The engine assembly of claim 16, wherein the pin supports the support member on the first mounting portion.

18. The engine assembly of claim 16, wherein the pin provides a radially outward biasing force within the recess to inhibit vibration of the support member relative to the first mounting portion.

19. The engine assembly of claim 15, wherein the support member and the first mounting portion are individual components having a spacing therebetween with the coupling member extending along the spacing, the first mounting portion expanding into the spacing based on a thermal load applied thereto.

20. The engine assembly of claim 19, wherein the spacing forms an air gap between the first mounting portion and the support member that inhibits heat transfer between the first mounting portion and the support member.

* * * * *